(12) United States Patent
Andrieu et al.

(10) Patent No.: US 8,362,743 B2
(45) Date of Patent: Jan. 29, 2013

(54) DEVICE FOR MECHANICALLY AND ELECTRICALLY CONNECTING A PORTABLE, BATTERY-OPERATED APPARATUS AND PORTABLE, BATTERY-OPERATED APPARATUS

(75) Inventors: Jeremie Andrieu, Munich (DE); Michael Bross, Munich (DE); Gustavo Nieto, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 318 days.

(21) Appl. No.: 12/787,007

(22) Filed: May 25, 2010

(65) Prior Publication Data

US 2010/0301801 A1 Dec. 2, 2010

(30) Foreign Application Priority Data

May 27, 2009 (DE) .......................... 10 2009 022 886

(51) Int. Cl.
*H02J 7/00* (2006.01)
*H01F 27/42* (2006.01)
(52) U.S. Cl. ........................................ 320/108; 307/104
(58) Field of Classification Search ................... 320/108
See application file for complete search history.

(56) References Cited

U.S. PATENT DOCUMENTS

| | | | | |
|---|---|---|---|---|
| 3,938,018 A | * | 2/1976 | Dahl | 320/140 |
| 4,873,677 A | * | 10/1989 | Sakamoto et al. | 368/204 |
| 5,550,452 A | * | 8/1996 | Shirai et al. | 320/108 |
| 5,600,225 A | * | 2/1997 | Goto | 320/108 |
| 5,923,544 A | * | 7/1999 | Urano | 363/22 |
| 7,211,986 B1 | * | 5/2007 | Flowerdew | 320/108 |
| 7,521,890 B2 | * | 4/2009 | Lee et al. | 320/108 |
| 2006/0145660 A1 | | 7/2006 | Black et al. | |
| 2008/0150482 A1 | | 6/2008 | Yazdi et al. | |

FOREIGN PATENT DOCUMENTS

| | | |
|---|---|---|
| DE | 198 22 045 A1 | 11/1999 |
| DE | 20 2007 011 059 U1 | 1/2008 |
| DE | 10 2007 054 341 A1 | 8/2008 |
| EP | 0 456 436 A2 | 11/1991 |
| EP | 0 823 717 A2 | 2/1998 |
| EP | 2 026 441 A1 | 2/2009 |

OTHER PUBLICATIONS

German Search Report dated Jul. 6, 2010 including partial English-language translation (Nine (9) pages).

* cited by examiner

*Primary Examiner* — M'Baye Diao
(74) *Attorney, Agent, or Firm* — Crowell & Moring LLP

(57) ABSTRACT

A device is provided for mechanically and electrically connecting a portable, battery-operated apparatus in order to operate the apparatus and/or to charge its battery. The device includes a receiving area for the apparatus as well as a first coil arrangement, which is disposed on, in or under the receiving area and which is designed for interaction with a second coil arrangement of the apparatus, when the apparatus is disposed in a predefined position on the receiving area. Finally, the device exhibits a first coupling element, which, in interaction with a second coupling element of the apparatus, the apparatus can be moved into the predefined position after being placed on the receiving area. The first coupling element exhibits at least a first component, which is designed for magnetic coupling with a respective second component of the apparatus.

22 Claims, 4 Drawing Sheets

DEVICE FOR MECHANICALLY AND ELECTRICALLY CONNECTING A PORTABLE, BATTERY-OPERATED APPARATUS AND PORTABLE, BATTERY-OPERATED APPARATUS

CROSS-REFERENCE TO RELATED APPLICATIONS

This application claims priority under 35 U.S.C. §119 from German Patent Application No. DE 10 2009 022 886.1, filed May 27, 2009, the entire disclosure of which is herein expressly incorporated by reference.

BACKGROUND AND SUMMARY OF THE INVENTION

The invention relates to a device for mechanically and electrically connecting a portable, battery-operated apparatus in order to operate the apparatus and/or to charge its battery. Furthermore, the invention relates to a portable, battery-operated apparatus, in particular a communications terminal and/or a media data player. Furthermore, the invention relates to a system, comprising a device of the aforementioned kind as well as a portable apparatus. Finally, the invention relates to a vehicle, in particular a motor vehicle or a utility vehicle.

The batteries of portable, battery-operated apparatuses have to be recharged on a regular basis in order to ensure the operational reliability of the apparatus. To this end, the apparatus typically has connection contacts, which can be connected to a typically external charger with a plug connector that is designed to match. The prior art also includes such apparatuses, in which the batteries are charged in a wireless manner. During wireless charging, the electromagnetic field, which a coil below the surface of a charger generates, transfers the energy into a coil of the apparatus to be charged, so that the battery can be charged. The coil arrangements of the charger and the apparatus to be charged have to be adapted to one another, because the effect of the charging process is influenced by the position of the apparatus to be charged on the charger. In the event that the position of the apparatus to be charged is not optimal, then the energy, which is not coupled into the coil arrangement of the apparatus to be charged, is radiated by the coil arrangement of the charger. Apart from the resulting energy losses, the radiation is emitted in the environment of the system including the charger and the apparatus to be charged, an emission that in a vehicle has to be avoided, if possible.

The charger and the apparatus to be charged are typically mechanically adapted to one another. For use in motor vehicles, a special receiving and fastening device, by which the apparatus can be fastened in a defined manner in the vehicle and which can make electrical contact with the apparatus, is expedient for a plurality of battery-operated, portable apparatuses. As a result, on the one hand, it is possible to charge the battery of the apparatus. On the other hand, the electrical apparatus, insofar as it involves a communications terminal, can be connected in a contactless manner (inductively) to a roof antenna for better reception and for avoiding radiation. The drawback with this system is that each apparatus has to have a matching receiving and fastening device, as a result of which there must be a sizeable diversity of variants.

Therefore, the object of the present invention is to provide a device that is intended for mechanically and electrically connecting a portable, battery-operated apparatus in order to operate the apparatus and/or to charge its battery. The device should avoid the aforementioned drawbacks. Another object of the invention is to provide a portable, battery-operated apparatus that corresponds to the device and that can be charged in a simple and efficient manner by the device. An additional object of the invention is to provide a system, which comprises a device and an apparatus and which does not exhibit the drawbacks known from the prior art. Finally, the object is to provide a vehicle equipped with a device according to the invention.

The invention provides a device for mechanically and electrically connecting a portable, battery-operated apparatus in order to operate the apparatus and/or to charge its battery. The device includes a receiving area for the apparatus. The invention provides a first coil arrangement, which is disposed under the receiving area and which is designed for interaction with a second coil arrangement of the apparatus, when the apparatus is disposed in a predefined position on the receiving area. Finally, the invention provides a first coupling element, which is disposed under the receiving area and, via interaction with a second coupling element of the apparatus, the apparatus can be moved into the predefined position after being placed on the receiving area. In this respect the first coupling element exhibits at least a first component, which is designed for magnetic coupling with a respective second component of the apparatus.

Furthermore, the invention provides a portable, battery-operated apparatus, in particular a communications terminal and/or a media data player. The portable, battery-operated apparatus includes a second coil arrangement, which is designed for interaction with a first coil arrangement, which is a component of the device and which is arranged under a receiving area of the device, when the apparatus is disposed in a predefined position on the receiving area. Furthermore, the apparatus includes a second coupling element, by which, via interaction with a first coupling element of the device, the apparatus can be moved into the predefined position after being placed on the receiving area. In this respect, the second coupling element exhibits at least a second component, which is designed for magnetic coupling with a respective first component of the device.

Furthermore, the invention includes a system, having a device according to the invention as well as a portable apparatus according to the invention.

Finally, the invention comprises a vehicle, in particular a motor vehicle or a utility vehicle, that exhibits a device according to the invention.

An optimal contactless charging of the battery of a portable, battery-operated apparatus is made possible by the invention. At the same time it is guaranteed that all of the energy expended in the coil arrangement of the device is also employed for charging the battery of the apparatus. As a result, there is no stray radiation that must be avoided especially in a motor vehicle. Furthermore, a reliable fixing of the apparatus on the device without the explicit provision of mechanical holding mechanisms is provided. This feature is made possible by the first and the second coupling element of the device and the apparatus, both of which ensure the fixing and the exact orientation of the first and second coil arrangement in relation to each other.

According to a practical embodiment of the device according to the invention, the first coil arrangement has a first main coil for generating a charge current for the battery of the apparatus, when this first main coil is coupled with a second main coil of the second coil arrangement. Corresponding thereto, in a further development the second coil arrangement of the apparatus according to the invention has a second main coil for generating a charge current for the battery of the apparatus, when this second main coil is coupled with the first main coil of the first coil arrangement.

According to an additional embodiment, the device performs data communication with a charging unit of the apparatus in order to control a charging process of the battery. The data communications between the device and the charging unit of the apparatus can take place with any transmission technology. For example, the commonly used Bluetooth technology can be used for this purpose. The data communication technology ensures that the coil arrangement and, in particular, the first main coil for generating the charge current, cannot be switched on in an uncontrolled manner. Instead, the beginning of the charging and the charging process as well as the end of the charging can be controlled with precision due to the data communications between the device and the portable, battery-operated apparatus.

Another practical embodiment provides that the first coil arrangement includes, as the means for data communications, a first control coil, which is coupled with the control unit and which is coupled with a second control coil of the second coil arrangement of the portable, battery-operated apparatus. To perform data communication, an inductive transmission method is used as a function of the charge of the battery of the apparatus. As soon as the first and second control coil of the device and the apparatus approach each other, an identification process can be started by inductive data transmission. Upon a successful identification, the charging process is then started by way of the main coils, which in turn initiates the charging process of the battery.

According to another practical embodiment, the at least one first component of the first coupling element and/or the respective second component of the second coupling element is/are designed for providing a magnetic field. In particular, the first coupling element includes, as the at least one first component, a permanent magnet. Corresponding thereto, the second coupling element includes, as the at least one second component, also a permanent magnet of opposite polarity. In an especially preferred embodiment, the first coupling element includes two permanent magnets of different polarity. Corresponding thereto, the second coupling element of the apparatus includes two permanent magnets of different polarity. In this way there is only one position, at which all four permanent magnets gravitate towards each other. This configuration with opposite polarities rules out the possibility that the wrong coils (that is, a main coil of a control coil) will stand opposite each other. As a result, a rotation by 180° can be avoided. This principle is also known as an error proof principle.

In an alternative embodiment, the first coupling element includes, as the at least one first component, a solenoid, which interacts with a metallic, second component of the second coupling element. In a further development of the apparatus according to the invention, the second coupling element includes, as the at least one second component, a metal body, which interacts with a respective solenoid of the first coupling element. This embodiment makes it possible to fasten the apparatus to the device and to start and end in a targeted manner the charging process of the battery of the apparatus.

In an additional embodiment of the device, the first component, which is designed as a solenoid, can be switched on and off by a manually operated switch. In this way the charging process can be started and/or ended. In an alternative, further improved embodiment, the first component, which is designed as a solenoid, can be switched on and off by the control unit. The solenoids can be activated, for example, on the basis of data communications via the first and second control coil of the device and the apparatus. For example, the activation occurs when the identification of the device and the apparatus in relation to each other has been successful. By activating the preferably several solenoids, the apparatus is moved into the predefined position in relation to the receiving area of the device, so that the aforementioned advantages of low energy and radiation losses are a matter of course.

The use of solenoids, instead of permanent magnets, has the advantage that magnetic objects, such as credit cards, which may be placed inadvertently on the receiving area of the device, cannot be damaged, as long as the solenoids are not activated. Furthermore, it is also not necessary to arrange a magnet on the apparatus, thus eliminating the possibility of damaging magnetizable objects in the vicinity of the apparatus.

Furthermore, it is preferred that a respective first component of the device be disposed in the center of the main coil and, if present, optionally in the center of the control coil. It is clear that, corresponding thereto, a respective second component is arranged in the center of the second main coil and optionally of the second control coil.

According to another advantageous embodiment, the contour of the receiving area cannot bring about a mechanical positioning and/or fixing of the apparatus. The positioning and/or fixing is achieved solely by way of the first coupling element, which is provided in the device and which interacts with the second coupling element of the apparatus.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
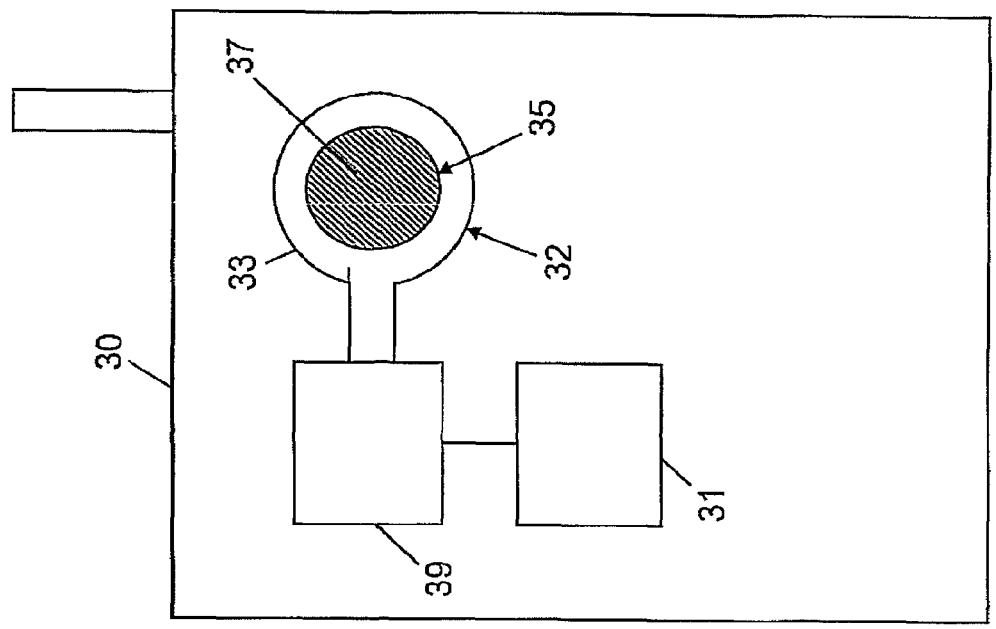
FIG. 1 is a schematic drawing of a first embodiment of a device, according to the invention, and a portable, battery-operated apparatus, according to the invention.
Figure 1:
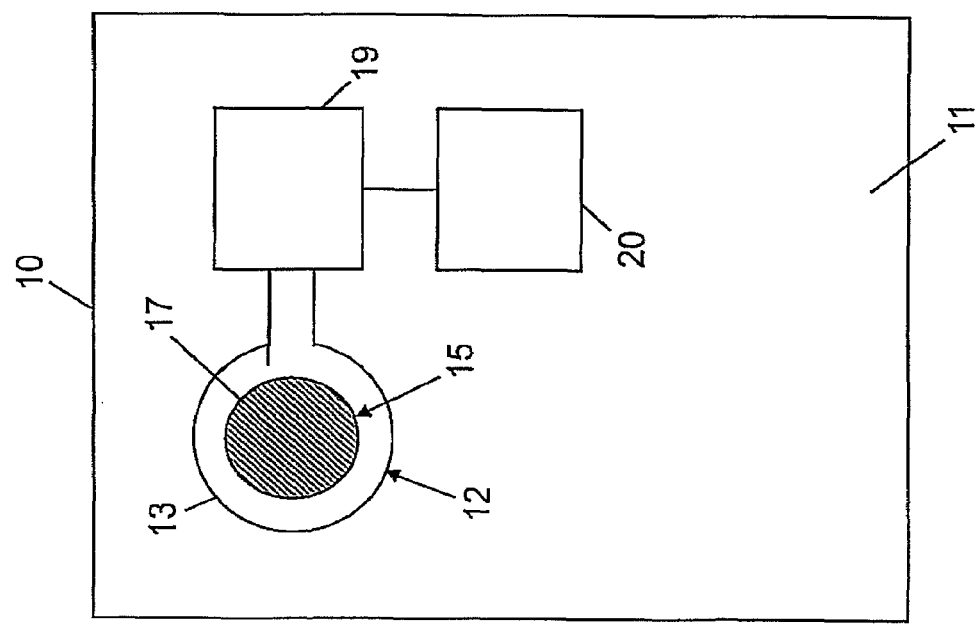

FIG. 1 is a schematic drawing of a first embodiment with the device 10 according to the invention and with a matching portable, battery-operated apparatus 30 according to the invention, positioned next to each other. The device 10, which is intended for mechanically and electrically connecting the portable, battery-operated apparatus 30 in order to operate the apparatus and/or to charge its battery, includes a receiving area 11, below which a first coil arrangement 12 is disposed. In the embodiment from FIG. 1, the coil arrangement 12 is formed by a single, first main coil 13. The first main coil 13 is designed for interaction with a second coil arrangement 32 of the apparatus 30, when the apparatus 30 is disposed on the receiving area 11 in such a manner that the first main coil 13 of the first coil arrangement 12 comes to rest in a predefined position with a corresponding second main coil 33 of the second coil arrangement 32 (see FIG. 2). The first main coil 13 serves in connection with the second main coil 33 of the portable, battery-operated apparatus 30 to charge a battery 31 of the apparatus 30. For this purpose, the battery 31 is coupled with the second main coil 33 by way of a charging unit 39. The current, required to charge the battery 31, is provided by the device 10, in which the first main coil 13 is connected to a charger 19. The charger 19 is controlled by a control unit 20, which is connected to the charger 19 for this purpose.

For the purpose of wireless charging of the battery 31 of the apparatus 30, one uses an electromagnetic field generated by the first main coil 13 below the bearing area 11 of the device 10. The second main coil 33 of the apparatus 30 intercepts the electromagnetic field of the first main coil 13 and converts it, in conjunction with the charging unit 39, into a charge current for the battery 31. The effect of this charging process is influenced, as is well-known, by the position of the second main coil 33 relative to the first main coil 13. In a non-optimal position, the uncoupled energy is radiated by the first main coil 13, as a result of which there are, on the one hand, energy losses, and, on the other hand, undesired stray radiation emitted into the environment of the combination of device 10 and apparatus 30.

Therefore, in order to design in the simplest way possible the positioning of the apparatus 30 on the receiving area 11 to maximize the effect of the charging process and/or to minimize the radiation of uncoupled energy, both the device 10 and the apparatus 30 have a first coupling element 15 and/or a second coupling element 35, by which in interaction the apparatus can be moved into the predefined, optimal position after it has been placed on the receiving area 11. To this end, the first coupling element 15 exhibits, as the first component, a permanent magnet 17, which magnetically couples with a permanent magnet 37 of opposite polarity. Preferably, the permanent magnet 17 and the permanent magnet 37 are arranged in the center of the first and/or second main coil 13, 33 respectively. As soon as a magnetic coupling of the magnets 17, 37 takes place, a self-orientation (or rather self-centering) of the first and second main coil 13, 33 in relation to each other ensues, as a result of which the optimal position for the charging process is provided.

Figure 2:
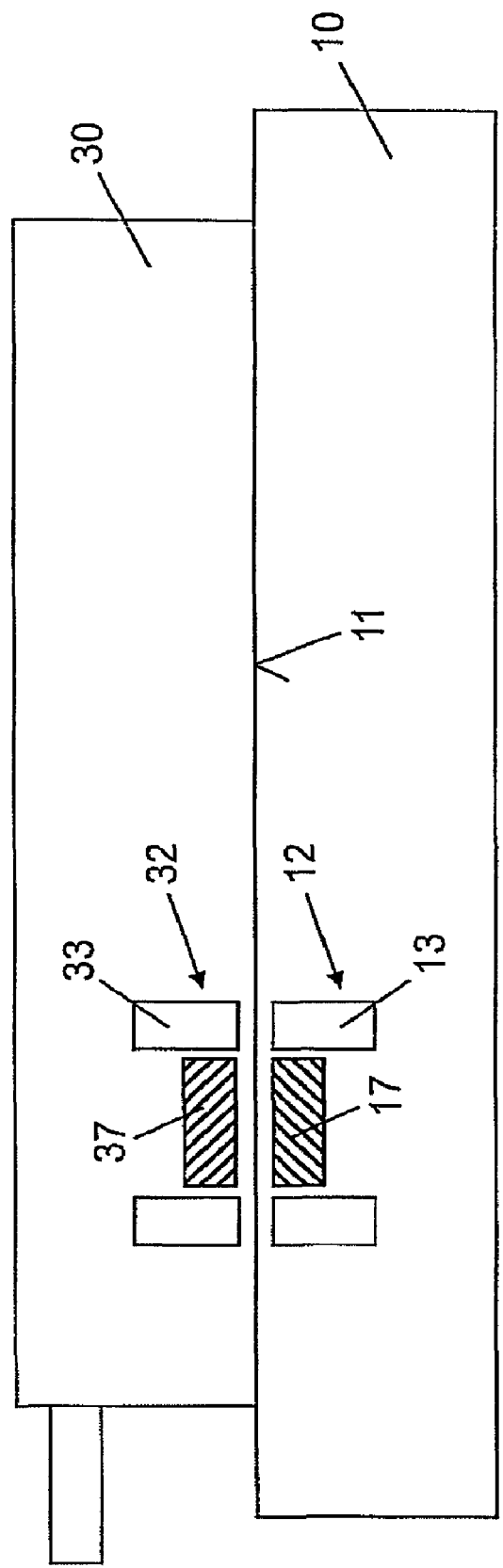
FIG. 2 is a cross sectional view of the apparatus, which is shown in FIG. 1 and which is arranged on the device accordingly.

This situation is shown in the cross sectional schematic drawing of FIG. 2, which shows clearly the apparatus 30, placed on the receiving area 11 of the device 10. At the same time, the schematic drawing shows that the magnets 17, 37 come to rest one above the other in a concentric manner due to their attractive force. Owing to the identical arrangement of the magnets 17, 37 in relation to the first and/or second main coil 13, 33, they are arranged exactly one above the other, so that the electromagnetic field, generated by the first main coil 13, can be totally absorbed by the second main coil 33 and can be converted into a charge current.

Figure 3:
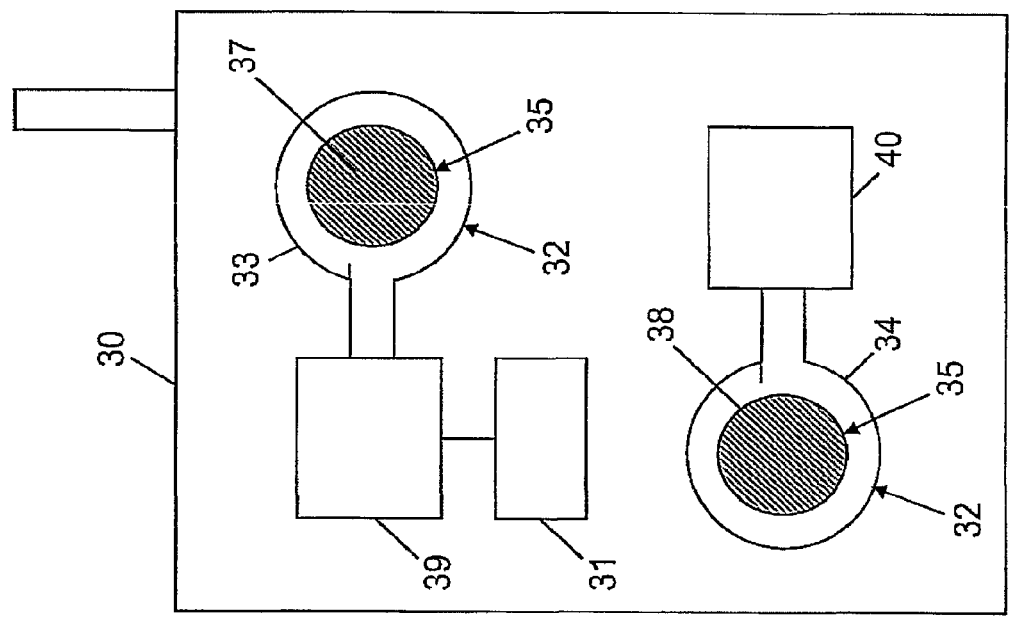
FIG. 3 is a schematic drawing of a second embodiment of a device according to the invention and a portable, battery-operated apparatus according to the invention.
Figure 3:
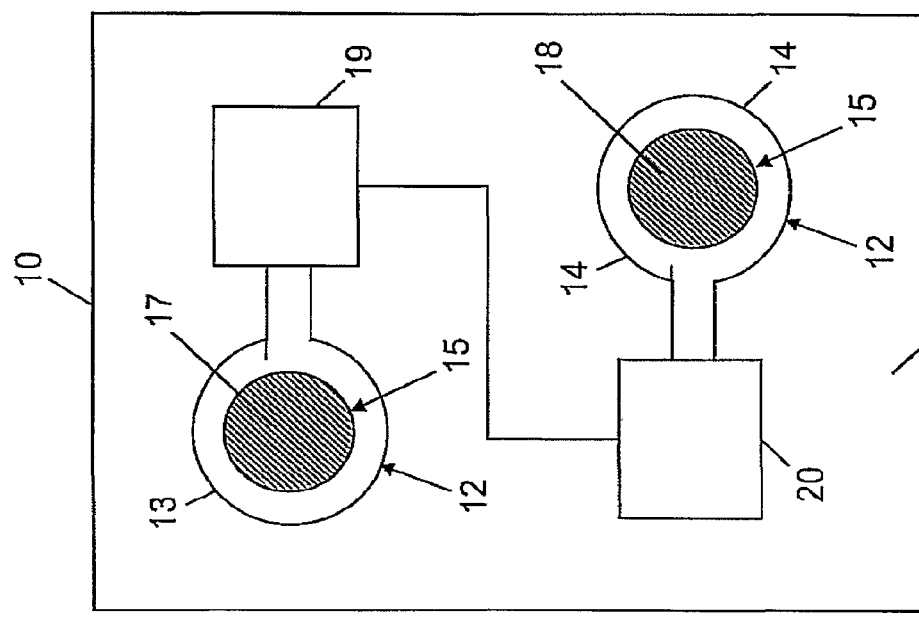
Figure 4:
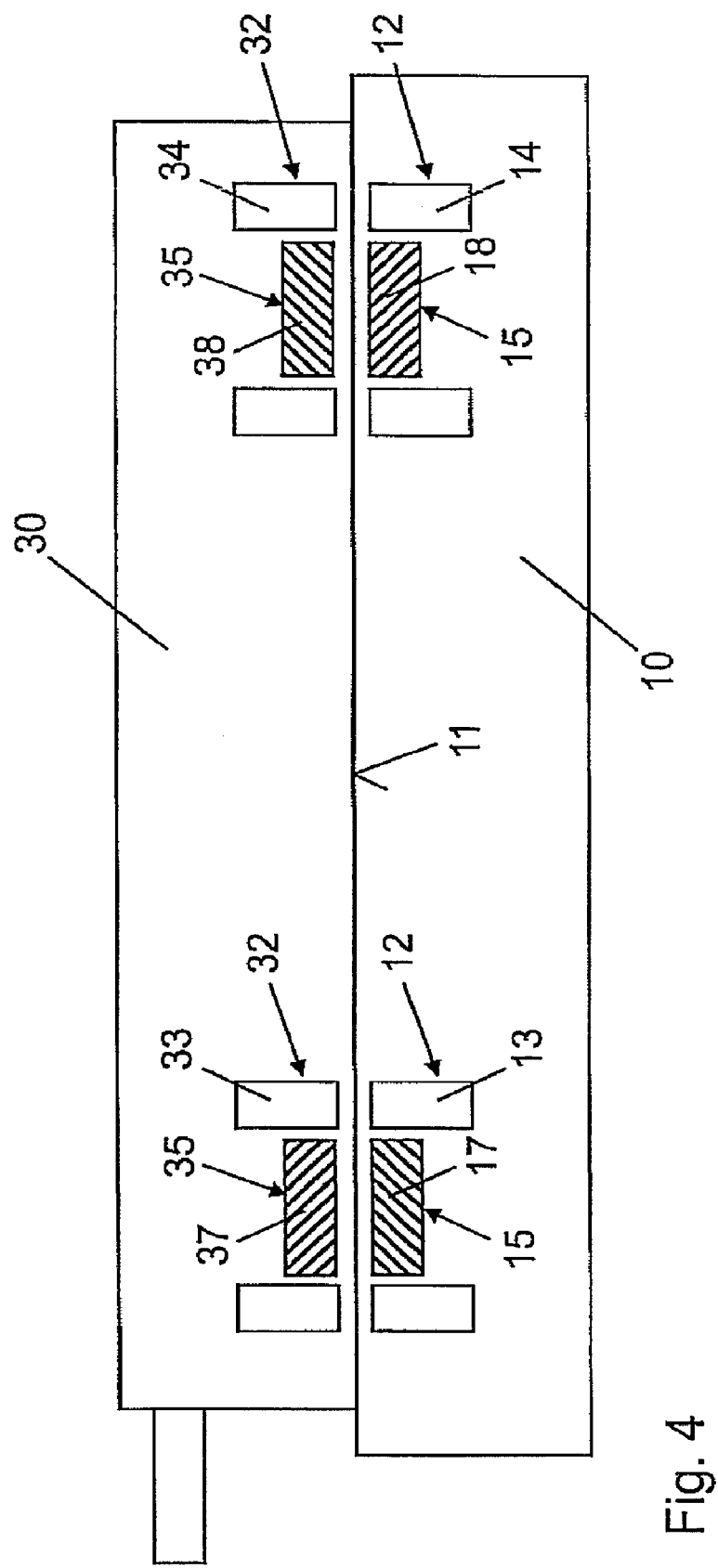
FIG. 4 is a cross sectional view of the apparatus, which is shown in FIG. 3 and which is arranged on the device accordingly.

FIGS. 3 and 4 show a second embodiment, which is further advantageous with respect to the first embodiment according to FIGS. 1 and 2. The coil arrangement 12 of the device 10 has, besides the first main coil 13, which is used to charge the battery 31 of the apparatus 30, a first control coil 14. Correspondingly thereto, the coil arrangement 32 of the apparatus 30 has a second control coil 34. The control coil 14 is connected to the control unit 20. The second control coil 34 of the apparatus 30 is connected to a control unit 40 of the apparatus 30. One magnet 18 and/or 38 respectively is arranged, in turn, in the center of the first and the second control coil 14, 34. These magnets may be, for example, permanent magnets. Preferably, the magnet 17 and the magnet 18 of the device 10 exhibit opposite polarity. Then, the polarity of the magnets 37, 38 is chosen such that an attractive force between the magnets 17 and 37 as well as 18 and 38 is generated.

The configuration, depicted in FIG. 3 and FIG. 4, shows only one position, at which the magnets 17, 18, 37, 38 gravitate towards each other. The arrangement of the opposite polarities of the magnets 17, 18, 37, 38 rules out the possibility that the wrong coils of the coil arrangements 12, 32 will stand opposite each other. As a result, a rotation by 180° is avoided, which provides a mistake proof system. At the same time, it is clear from FIG. 4 that the first and second main coil 13, 33, as well as the first and second control coil 14, 34, come to rest so as to be aligned relative to each other, when the apparatus 30 is arranged on the receiving area 11 of the device 10. In this case, the attractive force of the magnets 17, 37 and 18, 38 makes sure, as explained above, that the coils are correctly positioned in relation to each other.

As soon as the first and second control coil 14, 34 are located in the immediate vicinity, an identification process between the device 10 and the apparatus 30 starts. If this identification is successful, then the first main coil 13 of the device 10 is switched on, so that the charging process of the battery 31 of the apparatus 30 begins. The identification of the device 10 and the apparatus 30 serves to determine the compatibility of both components with respect to each other. For example, it is within the scope of the identification process to determine which charge current for charging the battery 31 is required. In addition, additional information, which is important for the charging process, can be exchanged. In this embodiment the data communication takes place by way of the control coils 14, 34. If the control coils are not present, as is the case in the first embodiment according to FIGS. 1 and 2, then the identification process may also take place in a different way, for example, by means of Bluetooth communication.

In another embodiment, the permanent magnetic coupling between the device 10 and the apparatus 30 could also be replaced by a solenoid magnetic coupling. For example, a solenoid could be provided in the center of the first main coil 13, and optionally a second solenoid in the center of the control coil 14. In this respect, the solenoid 17 would face a small metal plate in the center of the first main coil of the apparatus 30. Insofar as the second solenoid is provided in the center of the control coil 14 (analogous to the second embodiment), the solenoid faces a small metal plate in the center of the second control coil 34 of the apparatus 30.

In one embodiment the solenoids of the device 10 may be switched on and/or off by an ON/OFF push button. On powering up, the positioning and fastening of the apparatus on the receiving area 11 of the device 10 commences. At the same time or delayed in time, the charging process of the battery 31 of the apparatus 30 begins.

Dispensing with permanent magnets has the advantage that magnetizable objects, such as credit cards, which are deposited inadvertently on the charger, cannot be damaged, as long as the ON/OFF push button is not operated. Furthermore, a magnet does not have to be arranged on the apparatus 30, thus preventing damage to magnetizable objects in the vicinity of the apparatus 30.

In another embodiment (not illustrated), an ON/OFF push button for activating the solenoids does not have to be provided. The solenoids can be activated, for example, on the basis of a wireless communication between the apparatus 30 and the device 10, for example, via RFID (Radio Frequency Identification) by means of the control coils 14, 34. In the rest state the solenoids of the device 10 are switched off. As soon as the first and the second control coil 14, 34 of the device 10 and the apparatus 30 are in the immediate vicinity, an identification process starts. If the identification is successful, then the solenoid(s) of the device 10 switches (switch) on. Insofar as a solenoid is provided in the center of the first control coil, then this solenoid attracts the apparatus 30. A slight rotation of the apparatus 30 suffices for the solenoid in the center of the first main coil 13 to also attract the metal plate in the center of the second main coil 33 of the apparatus 30. At this point both coils of the coil arrangement 12, 32 are aligned, as a result of which the apparatus 30 is fastened on the device 10. Now the first main coil 13 of the device can be activated, whereupon the charging process starts.

In this embodiment, the solenoid(s) of the device 10 is (are) excited only after successful identification. This strategy eliminates any potential damage to incompatible objects, such as the aforementioned credit cards, by the electromagnetic fields. In addition, dispensing with a mechanical ON/OFF push button makes it possible to reduce the cost of the system.

One advantage of the invention consists of guiding a user's hand by intuition through the magnetic field, so that the apparatus 30 is moved automatically into the correct position on the receiving area 11 of the device 10. In this case it is not necessary to adapt the contour of the receiving area 11 of the device 10 to the contour of a housing of the apparatus 30. The receiving area 11 can be, for example, essentially flat.

After positioning the apparatus, both the optional control coils and the main coils for charging the battery of the apparatus are correctly aligned. As a result, the effect of the charging process is maximized. The radiation of the uncoupled energy is minimized. Hence, EMC [electromagnetic compatibility] problems can be largely eliminated.

The defined positions of the respective apparatuses can be used, for example, for other wireless technologies, such as inductive HF coupling, as a result of which it is possible to connect the apparatus to an antenna.

An additional advantage of the invention lies in the fact that the apparatus 30 remains fastened on the optimal position even in the event of adverse environmental conditions (for example, vibrations). In particular, the use of the device according to the invention is expedient in a vehicle, in particular a motor vehicle or utility vehicle.

Table of Reference Numerals
10 device
11 receiving area
12 first coil arrangement
13 first main coil
14 first control coil
15 first coupling element
16 first component
17 magnet
18 magnet
19 charging unit
20 control unit
30 portable, battery-operated apparatus
31 battery
32 second coil arrangement
33 second main coil
34 second control coil
35 second coupling element
36 second component
37 magnet
38 magnet
39 charging unit
40 control unit The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for mechanically and electrically connecting a portable, battery-operated apparatus in order to at least one of operate said apparatus and charge a battery of said apparatus, the device comprising:
    a receiving area for the apparatus, wherein a contour of the receiving area does not bring about a mechanical positioning of the apparatus;
    a first coil arrangement of the receiving area, the first coil arrangement being operatively configured to interact with a second coil arrangement of the apparatus when the apparatus is disposed in a predefined position on the receiving area;
    a first coupling element of the receiving area, the first coupling element being operatively configured to interact with a second coupling element of the apparatus so as to move the apparatus into a predefined position after being placed on the receiving area, said first coupling element comprising at least a first component, which is designed for magnetic coupling with a respective second component of the apparatus.

2. The device according to claim 1, wherein the first coil arrangement comprises a first main coil for generating a charge current for the battery of the apparatus, when said first main coil is coupled to a second main coil of the second coil arrangement.

3. The device according to claim 1, wherein the device comprises a data communication interface with a charging unit of the apparatus in order to control a charging process of the battery.

4. The device according to claim 3, wherein the first coil arrangement comprises, as the data communication interface, a first control coil, which is coupled with a control unit and which is coupled with a second control coil of the second coil arrangement.

5. The device according to claim 1, wherein the first component of the first coupling element provides a magnetic field.

6. The device according to claim 5, wherein the first component is a permanent magnet.

7. The device according to claim 1, wherein the first coupling element comprises two permanent magnets of different polarity.

8. The device according to claim 1, wherein the first coupling element comprises, as the first component, a solenoid, which interacts with a metallic, second component of the second coupling element.

9. The device according to claim 8, wherein the solenoid is switchable on and off by a manually operated switch.

10. The device according to claim 8, wherein the solenoid is switchable on and off by a control unit.

11. The device according to claim 1, wherein the first coil arrangement is disposed at least one of on, in and under the receiving area for the apparatus.

12. The device according to claim 1, wherein said device is integrated in a motor vehicle.

13. The device according to claim 1, wherein the first coil arrangement of the device comprises a first control coil and the second coil arrangement of the apparatus comprises a second control coil, and wherein the first control coil and second control coil form a wireless data communication interface over which a charging process of the battery is controlled.

14. The device according to claim 1, wherein the receiving area is substantially planar.

15. A portable, battery-operated apparatus, comprising:
    a second coil arrangement operatively configured to interact with a first coil arrangement, the first coil arrangement being for a receiving area of the apparatus, said interaction occurring when the apparatus is disposed in a predefined position on the receiving area, and wherein a contour of the receiving area does not bring about a mechanical positioning of the apparatus, a second coupling element operatively configured to interact with a first coupling element of the receiving area, wherein by way of said interaction the apparatus is moveable into a predefined position after being placed on the receiving area, said second coupling element having at least a second component that magnetically couples with a respective first component of the receiving area.

16. The apparatus according to claim 15, wherein the second coil arrangement includes a second main coil for generating a charge current for a battery of the apparatus when said second main coil is coupled with a first main coil of the first coil arrangement.

17. The apparatus according to claim 15, wherein the second coupling element includes as the second component, a permanent magnet.

18. The apparatus according to claim 17, wherein two permanent magnets of different polarity are provided as the second component.

19. The apparatus according to claim 15, wherein the second coupling element comprises, as the second component, a metal body that interacts with a respective solenoid of the first coupling element.

20. The apparatus according to claim 15, wherein the portable battery-operated apparatus is one of a communication terminal and a media data player.

21. The apparatus according to claim 15, wherein the receiving area is substantially planar.

22. A system, comprising:
a portable, battery-operated apparatus;
a device for connecting the portable, battery-operated apparatus in order to at least one of operate said apparatus and charge a battery of said apparatus; and
wherein the device comprises:
a receiving area for the apparatus, wherein a contour of the receiving area does not bring about a mechanical positioning of the apparatus;
a first coil arrangement of the receiving area, the first coil arrangement being operatively configured to interact with a second coil arrangement of the apparatus when the apparatus is disposed in a predefined position on the receiving area;
a first coupling element of the receiving area, the first coupling element being operatively configured to interact with a second coupling element of the apparatus so as to move the apparatus into a predefined position after being placed on the receiving area, said first coupling element comprising at least a first component, which is designed for magnetic coupling with a respective second component of the apparatus.

\* \* \* \* \*